United States Patent
Sorin et al.

(10) Patent No.: US 8,983,248 B2
(45) Date of Patent: Mar. 17, 2015

(54) OPTICAL TRANSMISSION MEDIA TO INDEPENDENTLY SUPPORT SINGLE-MODE AND MULTIMODE SIGNALS

(75) Inventors: Wayne Victor Sorin, Mountain View, CA (US); Michael Renne Ty Tan, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 220 days.

(21) Appl. No.: 13/562,487

(22) Filed: Jul. 31, 2012

(65) Prior Publication Data

US 2014/0037244 A1 Feb. 6, 2014

(51) Int. Cl.
  *G02B 6/26* (2006.01)
  *G02B 6/42* (2006.01)
  *G02B 6/38* (2006.01)
  *G02B 6/10* (2006.01)
  *G02B 6/35* (2006.01)

(52) U.S. Cl.
  CPC .............. *G02B 6/264* (2013.01); *G02B 6/3512* (2013.01)
  USPC .................... 385/28; 385/18; 385/47; 385/74; 385/129

(58) Field of Classification Search
  USPC ............... 385/15, 28, 31, 36, 47, 50, 18, 129; 372/18, 19, 26
  See application file for complete search history.

(56) References Cited

U.S. PATENT DOCUMENTS

| | | | |
|---|---|---|---|
| 5,077,815 A * | 12/1991 | Yoshizawa et al. | 385/28 |
| 6,185,346 B1 | 2/2001 | Asawa et al. | |
| 6,487,338 B2 | 11/2002 | Asawa et al. | |
| 2003/0185269 A1 | 10/2003 | Gutin | |
| 2007/0160323 A1* | 7/2007 | Deliwala | 385/28 |
| 2010/0215313 A1* | 8/2010 | Matsuoka et al. | 385/14 |

OTHER PUBLICATIONS

Ratowsky R.P. et al., "Propagation Modeling for Multimode Photonics," <http://www.polymath-usa.com/Phase_Space_Propagation/spie_with_RKK_doc.pdf>, Aug. 6, 1999.

Shemirani, M.B. et al., "Principal Modes in Graded-Index Multimode Fiber in Presence of Spatial- and Polarization-Mode Coupling," Journal of Lightwave Technology, vol. 27, No. 10, May 15, 2009.

* cited by examiner

*Primary Examiner* — Kaveh Kianni
*Assistant Examiner* — Hung Lam
(74) *Attorney, Agent, or Firm* — Hewlett-Packard Patent Department (57) ABSTRACT

A computing system includes an optical transmission media to propagate a single-mode signal and a multimode signal, and support mode matching with the single-mode signal and multimode signal. A lowest-order mode of the optical transmission media is to couple the single-mode signal, and at least one higher-order mode of the optical transmission media is to couple the multimode signal. The optical transmission media is to enable extraction of the single-mode signal from the optical transmission media independently of the multimode signal.

15 Claims, 7 Drawing Sheets

OPTICAL TRANSMISSION MEDIA TO INDEPENDENTLY SUPPORT SINGLE-MODE AND MULTIMODE SIGNALS

BACKGROUND

Optical signals for communication may be generated by a single-mode source or a multimode source. Optical signals based on single-mode sources are carried by corresponding single-mode communication links, and optical signals based on multimode sources are carried by multimode communication links. The two types of communication links (single-mode, multimode) are incompatible with each other, resulting in a need to replace an entire communication link and related components of a computing system if upgrading from one type of optical signal to another.

DETAILED DESCRIPTION

Optical communications for computing systems may include communication of optical signals between data centers, along a backplane of a computing system, and/or other applications including communication within a computing system and between computing systems. The optical signals may be carried by an optical transmission media, which may include waveguides, fiber optic cables, and other optical communication formats. In examples provided herein, the optical transmission media may support multiple different types of optical signals, without a need to decide on supporting one specific type of optical signal. Thus, a single infrastructure may support existing solutions based on one format and allow for future upgrades to another format, as well as supporting simultaneous use of different formats.

Figure 1:
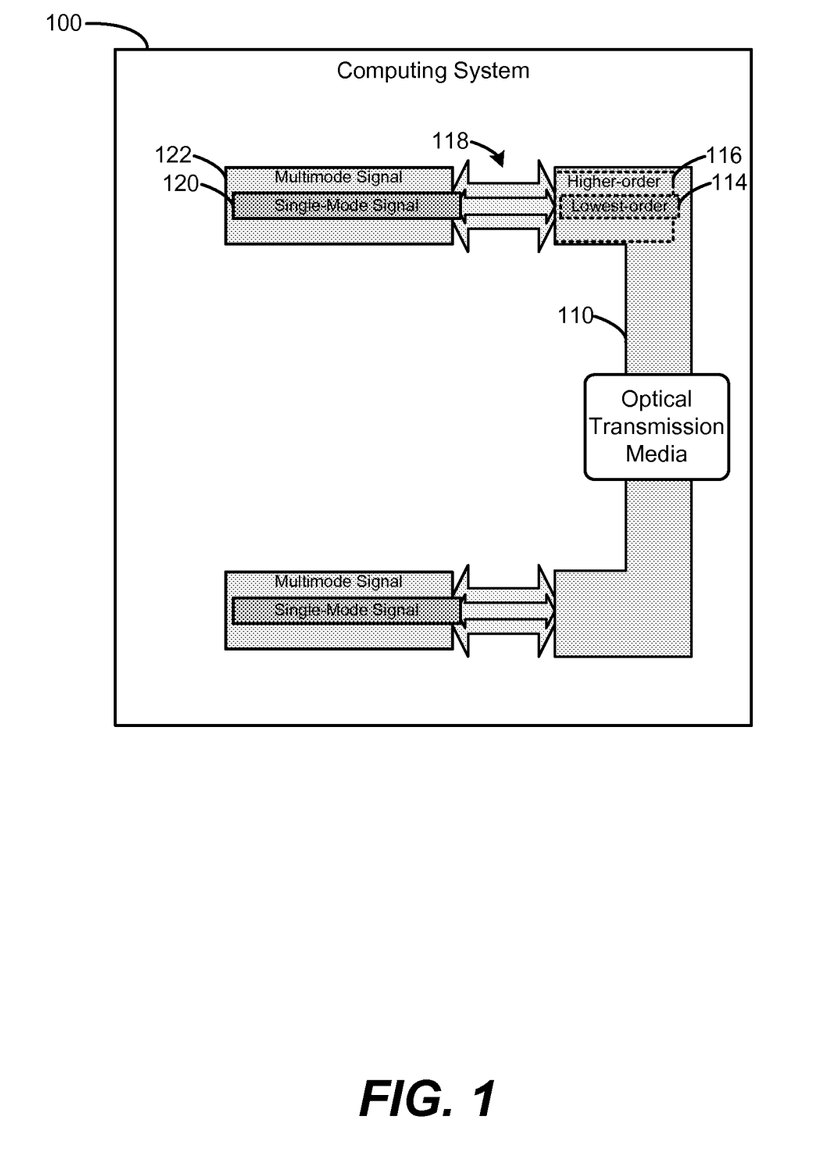
FIG. 1 is a block diagram of a computing system including an optical transmission media according to an example.

FIG. 1 is a block diagram of a computing system 100 including an optical transmission media 110 according to an example. The optical transmission media 110 is to propagate a single-mode signal 120 and a multimode signal 122, and support mode matching 118 with the single-mode signal 120 and multimode signal 122. A lowest-order mode 114 of the optical transmission media 110 is to couple the single-mode signal 120. At least one higher-order mode 116 of the optical transmission media 110 is to couple the multimode signal 122. The optical transmission media 110 is to enable extraction of the single-mode signal 120 from the optical transmission media 110 independently of the multimode signal 122. The computing system 100 may be a group of datacenters communicating to each other across the optical transmission media 110. In an example, the computing system 100 may be a server including a backplane based on an optical transmission media 110.

The optical transmission media 110 may be a multimode graded-index fiber (MM-GIF), multimode waveguide, or other form of optical communication. A plurality of optical transmission media may be used in a bus configuration. Multimode waveguides may include graded index waveguides, hollow-metal waveguides (HMWG) including an air core where light travels, step-index waveguides, and other types of waveguides.

The single-mode signal 120 may be generated by a single-spatial mode optical source, and the multimode signal 122 may be generated by a multi-spatial mode optical source. Optical sources may include a Light Emitting Diode (LED), Vertical Cavity Surface Emitting Laser (VCSEL), Fabry-Perot laser, Silicon Photonic (SiP)-based optical source, Indium phosphide-based optical source, edge emitting laser, single-mode laser, Distributed Feedback (DFB) laser, Distributed Bragg Reflector (DBR) laser, and other sources. An optical source may have high-speeds and high modulation rates, and may generate signals at wavelengths such as 780 nanometers (nm), 850 nm, 980 nm, 1060 nm, 1300 nm, and other wavelengths associated with optical signal sources. Optical sources may include various features, such as providing a single transverse (spatial) mode and multiple longitudinal (frequency) modes (e.g., a Fabry-Perot laser).

In an example, the optical transmission media 110 may be based on a multimode graded index fiber (MM-GIF), so that it can be used for both multimode signal 122 (e.g., from a VCSEL) and also single-mode signal 120 (e.g., from a single-mode lasers such as those based on Silicon Photonic applications). Mode matching may be used to excite a lowest order mode of the optical transmission media 110, enabling the exemplary MM-GIF to be used as though it were a single mode fiber (SMF) to couple the single-mode signal 120. Coupling tolerance can be slightly relaxed when using a MM-GIF, because the single-mode spot size associated with mode matching 118 is about 50% larger for the MM-GIF, compared to the single-mode spot size for a typical SMF.

Thus, the optical transmission media 110 (e.g., a MM-GIF) enables the computing system 100 to have an infrastructure (e.g., backplane) that can accommodate single-mode and multimode optical solutions. There is no need to limit the computing system 100 to supporting only one type of optical communication infrastructure (e.g., limiting the computing system 100 by using a SMF (single-mode fiber) backplane to support only a single-mode optical source). Furthermore, the optical transmission media 110 enables both single-mode and multimode solutions to be wavelength multiplexed to share the same channel simultaneously. Computing system 100 can start out with established lower-risk multimode optical solutions (VCSELs) to use the optical transmission media 110, and potentially upgrade to single-mode optical solutions (single-mode Si Photonics) while remaining backwards compatible.

The optical transmission media 110 can wavelength multiplex the multimode signal 122 and single-mode signal 120 (e.g., VCSEL and Si Photonics) together very efficiently without optical losses. The wavelength multiplexing may be performed in addition to selectively combining, aligning, and/or coupling the signals to the optical transmission media 110. The multiple different wavelengths associated with the signals may be selectively coupled to the optical transmission media 110 in that the multimode signal 122 may be coupled into the fundamental mode of the optical transmission media 110. Thus, mode matching 118, including aligning and coupling the signals to the optical transmission media 110, is more than standard wavelength multiplexing.

Optical modes associated with the optical transmission media 110 are described in terms of a simplified view using one-dimensional Hermite Gaussian mode approximation, such as a simplified one-dimensional model. Both x and y polarizations are possible, providing additional mode possibilities. A number of two-dimensional spatial modes are approximately equal to the square of the number of one-dimensional modes. Thus, references to "mode" throughout the specification include references to one-dimensional Hermite Gaussian modes.

Multiple signals may be carried on the optical transmission media 110. In an example, dense wave division multiplexing (DWDM) may be used to enable many channels to be carried on one single spatial mode. Many implementations of the single-spatial mode source can be used for single frequency lasers to provide DWDM. Different lasers may be chosen to be spaced at maybe 50 GHz intervals, for very dense WDM spacing, or even 25 GHz intervals. Many channels may be fit on one single spatial mode, such as DWDM with 80 channels on one single spatial mode at approximately 1.5 microns. Thus, this concept may be used to provide additional bandwidth.

In an example, a standard multimode fiber having a core diameter of 50 μm and a numerical aperture (NA) of 0.2 radian (e.g., 50 GIF) may be used for the optical transmission media 110 that is multimode to handle multimode sources. The GIF also can use a single mode source, if excitation of the single mode does not substantially excite the other modes of the optical transmission media 110. For example, the optical transmission media 110 may couple a single-spatial mode optical source mostly into its lowest order mode. There may be a small portion of the single-spatial mode optical source coupled into the higher order modes, but most of its power is to be coupled into the lowest order spatial mode of the optical transmission media 110. The optical transmission media 110 is to carry multiple sources (including multimode and single-mode sources), and not cause the various modes/sources to couple with each other. For the GIF, the different modes can travel at different speeds and avoid coupling with each other. Multimode and single-mode data streams may be combined for transmission over the optical transmission media 110, while mode matching and keeping the various signals at their corresponding modes. Characteristics of the optical transmission media 110 such as refractive index, index profile, and its effects on wavelengths may be considered and tailored. For example, a 50 GIF OM4 fiber may be used, where OM4 is defined in TIA-492-AAAD, "Detail specification for 850-nm laser-optimized, 50-μm core diameter/125-μm cladding diameter class Ia graded-index multimode optical fibers of OM4 performance." Other fibers may be used, such as 25 μm, 0.1 radian GIF (25 GIF), or other fibers having various index profiles, such as graded index and/or step index profiles, according to known fiber standards such as the International standard ISO/IEC 11801 regarding general-purpose telecommunication cabling systems (structured cabling) and/or TIA-598C standards.

The optical transmission media 110 is to enable extraction of the single-mode signal 120 independently of the multimode signal 122. For example, the single-mode signal 120 may be provided at a different wavelength than the multimode signal 122, enabling wavelength demultiplexing to be used to extract the signals separately from each other. In another example, different modal information associated with the signals can be used for separately extractable signals. The signals may be associated with modes travelling at different phase velocities, e.g., the lowest order mode may travel at a different phase velocity than any of the other modes. A coupling mechanism (e.g., mode matching 118) may be phase matched to the lowest order mode, to extract the lowest order mode without extracting the higher order modes. A similar technique may be used to extract higher order modes. In an example, phase-matched coupling may be performed using a diffraction grating, or evanescent tail, to provide independently extractable single-mode signal 120 and multimode signal 122 based on optical phase matching and perturbing the phase periodically just at the right period to match into another mode. Other techniques are also available for independent extraction of the signals.

The single-mode signal 120 and multimode signal 122 are associated with spatial modes having mismatched phase velocities, to prevent the signals from coupling between each other. In an example, the phase velocity mismatches may exist between the lowest order mode and the other modes, providing the biggest phase match difference for the lowest order spatial mode relative to the other higher-order spatial modes. If the optical transmission media 110 is associated with a lowest order mode phase velocity that is not matched to any of the other modes, the higher order modes would have a phase velocity unlike the lowest order mode.

Figure 2:
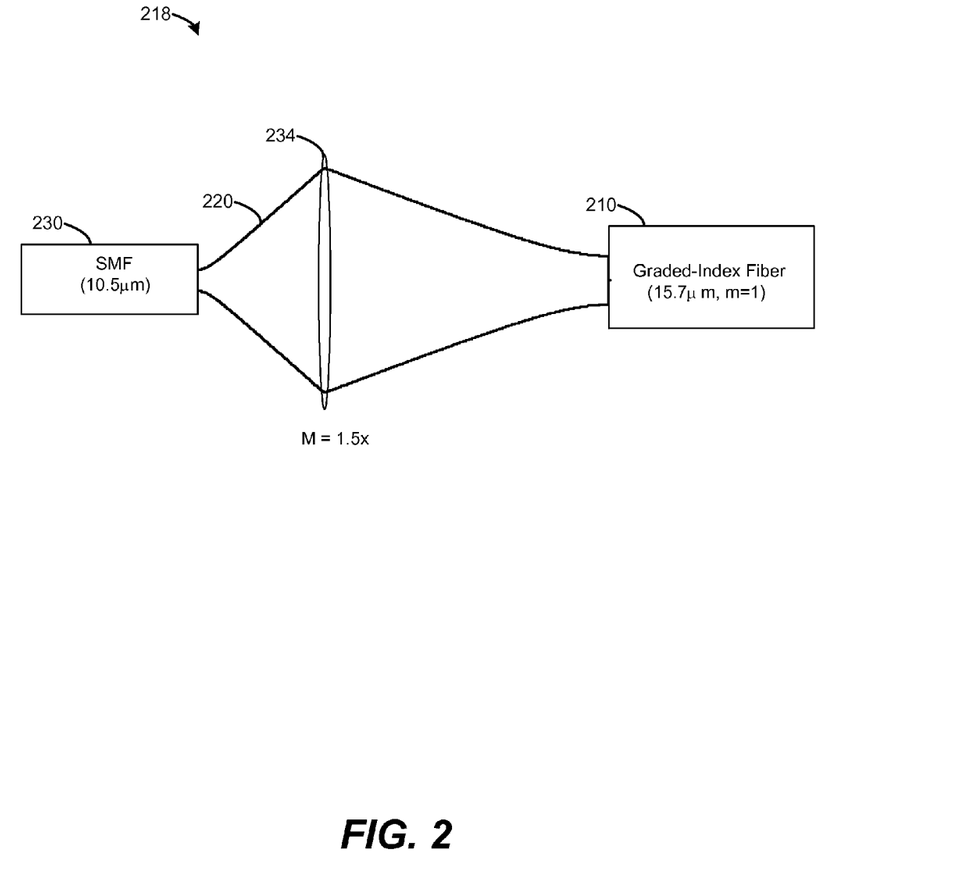
FIG. 2 is a block diagram of a mode matching system including an optical transmission media and an air gap according to an example.

FIG. 2 is a block diagram of a mode matching system 218 including an optical transmission media 210 and an air gap according to an example. Single mode media 230 provides a single-mode signal 220 that is expanded to lens 234. The lens focuses the signal and couples the signal into the optical transmission media 210.

The example of FIG. 2 demonstrates a single-mode launch from a 10.5 μm SMF into a 15.7 μm 50 GIF at 1.55 μm. The lens 234 provides a 1.5× adjustment in spot sizes. Thus, comparing between the multimode spot on the MM-GIF optical transmission media 210 and the single mode spot of the SMF single-mode media 230, there is about a 1.5× (50%) change in spot size. The spot sizes may vary depending on the wavelength used, and could vary by approximately 40-50%.

Coupling a single-mode laser into a single-mode fiber may rely on a relatively high degree of precision, perhaps on the order of 1 micron precision. Such a precise coupling precision also may be used to couple a single-mode laser to a lowest order spatial mode of a GIF, such as a GIF used for the optical transmission media 210. Once the lowest order mode of the GIF is excited, the signal will remain in this lowest mode as it propagates along the fiber. The reason it does not easily couple to other modes of the GIF is due to a mismatch in phase velocities of the GIF. For a standard 50 μm GIF, the beat length between fiber modes is about 1.15 mm. This beat length is smaller than most polarization preserving fibers which can preserve a single polarization mode without easily cross-coupling to the other polarization. The mode holding ability for a GIF may be as good as or better than most polarization preserving fibers. At the output of the GIF the lowest order mode can be coupled back into a single mode fiber (or waveguide) and in theory have the same loss as if a SMF was used. The transmitted single-mode signal 220 can have the same performance and loss independent of whether the optical transmission media 210 was constructed using SMF or MM-GIF. Thus, the optical transmission media 210 enables transmission of single-mode signal 220 without degradation, while enabling coupling of other (e.g., non-singlemode) signals. The mode matching system 218 is shown using an air gap connection. However, other connections are possible, including fusion splice, connector butt couple, or other couplings to serve as possible mode matchers, connectors, and/or converters.

Figure 3A:
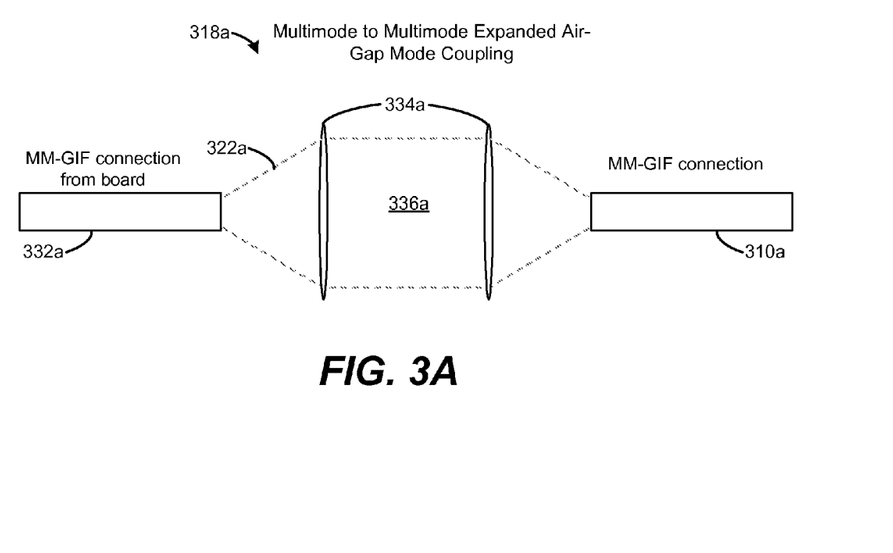
FIG. 3A is a block diagram of a mode matching system including an optical transmission media and an air gap according to an example.

FIG. 3A is a block diagram of a mode matching system 318a including an optical transmission media 310a and an air gap according to an example. A multimode media 332a provides a multimode signal 322a that expands to a lens 334a. The expanded signal crosses an air gap as an expanded beam 336a, and is focused by a lens 334a onto the optical transmission media 310a.

The air-gap mode matching system 318a may be used to couple a signal from, for example, a removable system board to the optical transmission media 310a of a backplane of a computing system. Air-gap connectors may be used for dust mitigation, wherein a dual lens connector may use an expanded collimated beam between connector interfaces to minimize any variations caused by dust and/or alignment tolerances.

Various tolerances may be used to align a lens to its corresponding media (e.g., fiber). For example, lens alignment to the optical transmission media 310a (e.g., to a 50 µm-GIF) may have a high precision in order to also align a single-mode portion of the signal being coupled into the optical transmission media 310a. With such precision, the optical transmission media 310a may be used to couple either multimode or single-mode signals. In contrast, if a more tolerant multimode solution is to be used (e.g., between the multimode media 332a connecting to a removable system board), then optical alignment for the launch coupling into the backplane can be at a reduced precision. If a single-mode solution is used (e.g., see FIG. 3B), then higher accuracy/precision coupling may be used on the launch side of the air-gap connector.

Figure 3B:
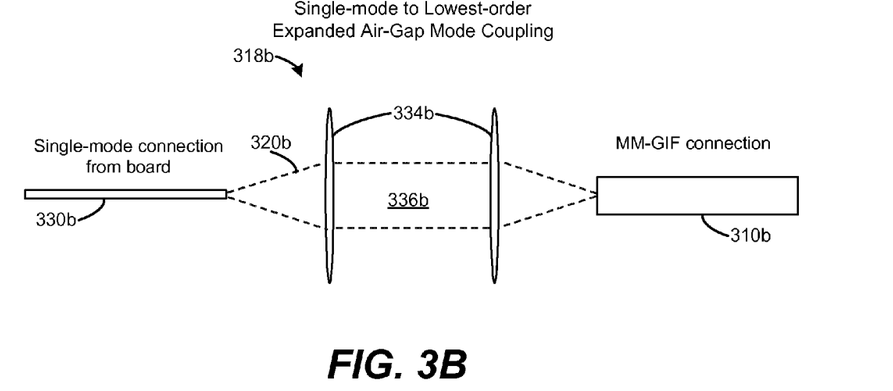
FIG. 3B is a block diagram of a mode matching system including an optical transmission media and an air gap according to an example.

FIG. 3B is a block diagram of a mode matching system 318b including an optical transmission media 310b and an air gap according to an example. A single-mode media 330b provides a single-mode signal 320b that expands to a lens 334b. The expanded signal crosses an air gap as an expanded beam 336b, and is focused by a lens 334b onto the optical transmission media 310b. In an example, a single-mode media 330b from a removable system board of a computing system may be coupled to a backplane of the computing system based on the optical transmission media 310b. The single-mode signal 320b in FIG. 3B may be multiplexed with the multimode signal 322a of FIG. 3A.

In an example, a 1.55 µm input signal is coupled into a SMF28 single-mode media 330b associated with 10.4 µm. The first lens between the signal spread from the SMF28 and the air gap may be (⅔)f, and the second lens between the air gap and the MMF optical transmission media 310b may be 1 f. Lenses may be based on different focal lengths and/or distances to provide various properties for the air gap connectors. The MMF optical transmission media 310b may be a 50 GIF associated with 15.7 µm.

Figure 4:
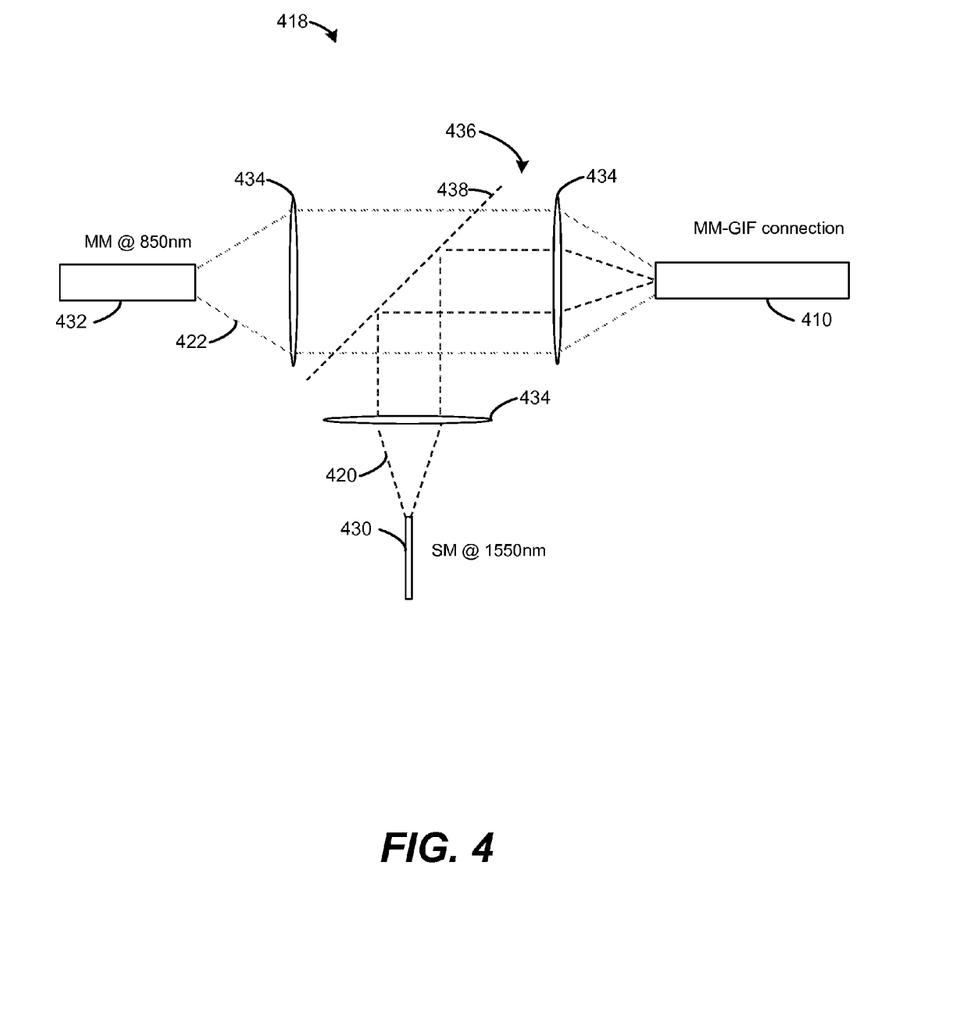
FIG. 4 is a block diagram of a mode matching system including an optical transmission media and an air gap according to an example.

FIG. 4 is a block diagram of a mode matching system 418 including an optical transmission media 410 and an air gap according to an example. A multimode media 432 is to provide a multimode signal 422 to a lens 434, and the single-mode media 430 is to provide a single-mode signal 420 to a lens 434. A mirror 438 is used to combine the signals in expanded beam 436, which is focused by a lens 434 for coupling the combined signal into the optical transmission media 410. The mirror 438 may be a partially reflecting, wavelength-selective, and/or other mirror. FIG. 4 shows multiplexing signals from a multimode fiber at 850 nm wavelengths and signals from a single-mode fiber at 1550 nm wavelengths onto the same optical transmission media 410, such as a MM-GIF backplane.

The expanded beams for the single-mode signal 420 and multimode signal 422 may be expanded to different sizes. The multimode beam is wider and/or larger going into the optical transmission media 410, about 3-4 times bigger than the single mode beam, which is smaller. The optical transmission media 410 may be aligned to one lens 434 to focus both signals. Lenses having different focal lengths (e.g., for a VCSEL optical source vs. a SiP optical source), or the same lenses may be used but based on different imaging distances or other optical factors. Lens alignment may be adjusted on the input side of the optical transmission media 410.

The MM-GIF connection via optical transmission media 410 may be to a backplane of a computing system, or to a data connection between data centers of a computing system. Lenses associated with a single-mode signal 420 may be aligned based on a higher precision/accuracy relative to an optical transmission media (e.g., relative to single-mode media 430 and/or optical transmission media 410). Once aligned, the lenses may be locked in place using a connector or other assembly. For example, a self-aligning snap together assembly using passive alignment may be used to secure a lens with respect to an optical transmission media. Passive alignment may be used for various components to reduce costs. If passive alignment does not provide a high enough accuracy, active alignment may be used. The lenses are to be aligned to the fiber accurately in a connector, but the connector may rely on expanded beam 436 to provide greater tolerance for misalignment between lenses across an air gap. Different levels of strictness for alignment may be used based on whether the lens focuses a spot for a single-mode signal 420 or a higher-order mode such as multimode signal 422. A system board using mode matching system 418 may be removable from a computing system by sliding the board into and out of a receiving slot that passively aligns lenses across an air gap.

Thus, there may be a tighter tolerance for single-mode to single-mode coupling, but the multimode couplings may have a looser tolerance for coupling accuracy. When multiplexing, the couplings can be combined, while accommodating the different coupling tolerances.

Figure 5:
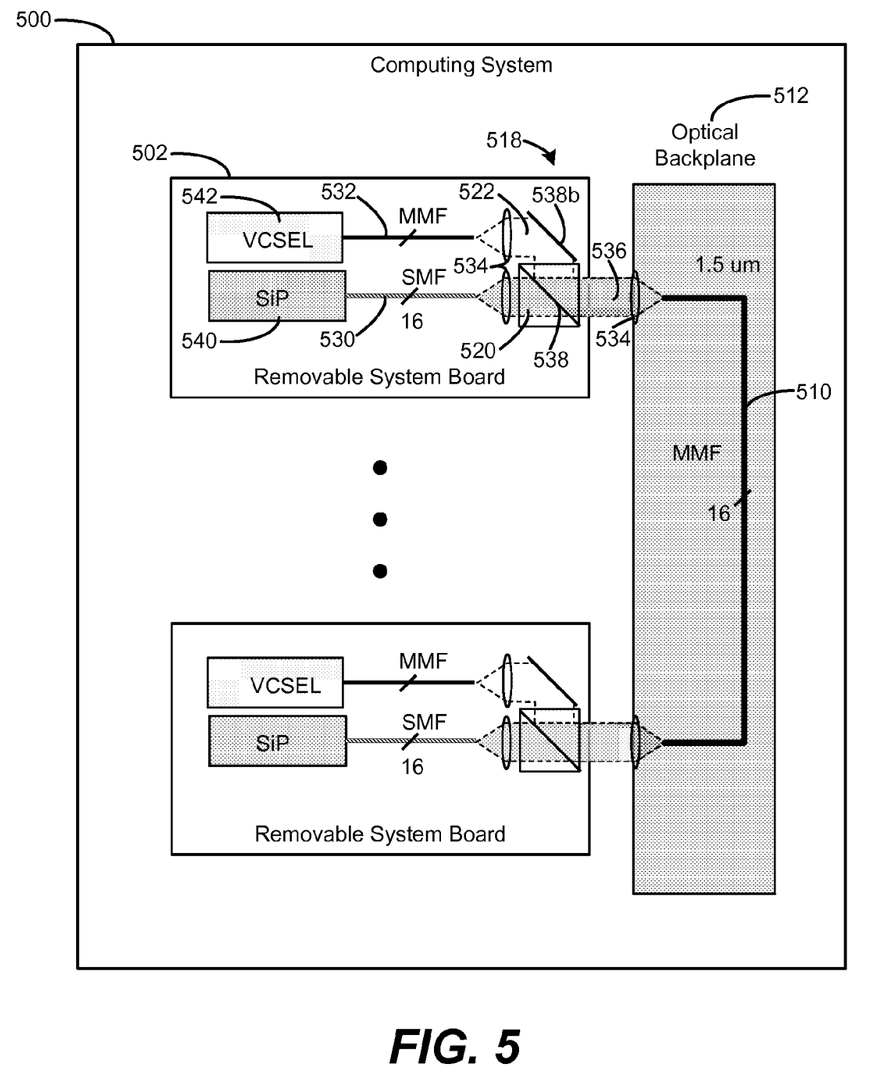
FIG. 5 is a block diagram of a computing system including an optical transmission media and a removable system board according to an example.

FIG. 5 is a block diagram of a computing system 500 including an optical transmission media 510 and a removable system board 502 according to an example. The computing system 500 may include an optical backplane 512 incorporating the optical transmission media 510. The optical backplane 512 also may include a lens 534 for coupling to the optical transmission media 510. A removable system board 502 may be coupled to the optical backplane 512 via expanded beam 536 across an air gap. The system board 502 may include multiple optical sources such as single-mode source 540 and multimode source 542. The single-mode source 540 is shown as a silicon photonics-based source, and the multimode source 542 is shown as a VCSEL. The single-mode source 540 is to provide single-mode signal 520 via single-mode media 530. The multimode source 542 is to provide multimode signal 522 via multimode media 532. A mode matching system 518 is to combine the single-mode signal 520 and the multimode signal 522 based on wavelength-selective mirror 538 and mirror 538b. The optical transmission media 510, single-mode media 530, and multimode media 532 may be provided in a bus configuration of multiple optical media, e.g., a bus of 16 as illustrated.

The optical backplane 512 may be integrated with the computing system, based on providing support for multiple different types of optical signals that may be used in removable system board 502. Thus, there is no need to swap out the optical backplane 512 if upgrading from one optical infrastructure (e.g., based on LEDs or VCSELs) to another (e.g., based on single-mode optical sources such as single-mode lasers or SiP sources). In an example, the optical backplane 512 is upgradeable and may provide a replacement optical transmission media 510 for the computing system 500.

A first-order estimate may be provided for an alignment tolerance for the optical transmission media 510 of the optical backplane 512 relative to a central axis of lens 534 to collimate the light. The tolerance for aligning the lens 534 and optical transmission media 510 may be, for example, ±1.5 µm. However, collimating to the wider expanded beam 536 across the air gap provides a relaxed strictness of alignment, as well as tolerance for dust or other contamination, between the removable system board 502 and the optical backplane 512 across the air gap. Thus, the removable system board 502 may be aligned in the computing system 500 based on a passive alignment sliding into a slot of a rack server, for example.

As for data capacity, for an example setup using MMF only without also multiplexing with a SMF, an initial data rate per board may be 16×25 G=400 Gbps (1λ); 4x=1.6 Tbps (4λ); (expandable to more rows). For dual MMF and SMF multiplexed together to provide additional data rate per board may be 8×16×25 G=3.2 Tbps (8λ); 4x=12.8 Tbps (32λ).

The optical transmission media 510, and its capability of carrying multiple data signals, enables an installation to support upgrade and migration over time. A given installation may initially support multimode VCSEL sources first to provide an initial setup that is affordable. Then, over time, the installation may be upgraded to add single-mode support, such as Si photonics, on top of the multimode support, to increase capacity and enable compatibility with newer removable system boards operating at increased optical capacities. Thus, computing system 500 may provide full backward compatibility with older generations with a capacity to transmit the original multimode solutions and still provide upgradability to work with the higher performance single mode solutions. An advantage is that a single backplane infrastructure may be used for compatibility with both single-mode and multimode communication solutions. If a single-mode solution (e.g. silicon photonics) is coupled to the optical transmission media 510, then the coupling tolerances will be approximately the same (or slightly relaxed) compared to using a traditional single-mode fiber. If a multimode solution (e.g. VCSELs) is coupled to the optical transmission media 510, then coupling tolerances can be relaxed by approximately a factor of 5-10. This enables both lower cost multimode solutions and potentially higher performance single-mode solutions to be used over the same optical transmission media 510 infrastructure without needing to change the backplane. Also, using multiplexing or other forms of coupling multiple signals, both multimode VCSELS (either at 850 nm or 980 nm) and single-mode silicon photonics (at either 1300 nm or 1550 nm), or other optical sources, can be transmitted over the same optical transmission media 510 at the same time. This allows for future SiP upgrades while still being backwards compatible with initial deployments using multimode VCSELs.

Examples may support coupling multiple different optical sources at a given wavelength band, and multiple different optical sources at different wavelength bands. Examples may support coupling multiple wavelength multimode sources and multiple wavelength single-mode sources, and the sources all may be coupled to the optical transmission media 510.

Figure 6:
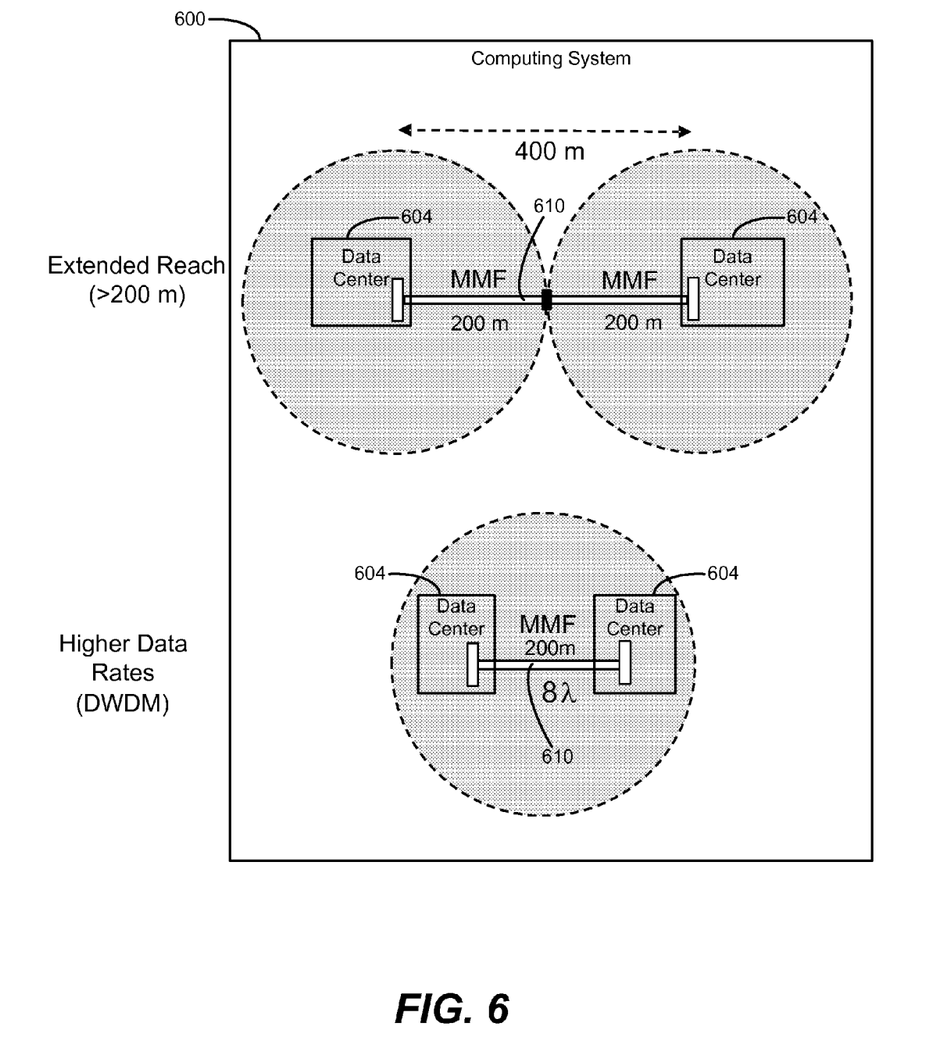
FIG. 6 is a block diagram of a computing system including an optical transmission media according to an example.

FIG. 6 is a block diagram of a computing system 600 including an optical transmission media 610 according to an example. The optical transmission media 610 is to provide extended reach and/or higher data rates for a data center 604.

The optical transmission media 610 illustrates connections between datacenters, though optical transmission media 610 also may be used for connections within a datacenter or server backplane. The optical transmission media 610 may be kilometers in length. Potential data center applications may use the optical transmission media 610 to provide data rates of 25 Gbps or more, or for DWDM applications.

The optical transmission media 610 can support longer distances based on transmitting a lower-order spatial mode signal, and can use higher data rates for shorter distances by also supporting higher-order spatial mode signals. In an example, OM4 fiber may be used to support 4.7 GHz*km, 100 ps/nm/km. Thus, for 200 m, the optical transmission media 610 may support 23 GHz, 10 psec.

For a given optical transmission media 610, if using a multimode fiber, the multimode fiber may be manufactured with different tolerances such as a spot sizes variance. This variance may affect coupling into the various modes, such as causing a few percent of a lowest-order mode of an optical signal to couple to the nearest/lowest order modes, leading to interference. Accordingly, it is possible to use stricter manufacturing tolerances to avoid interference or other insertion loss issues. Similarly, index profiles (e.g., quadratic index) of different fibers may vary due to manufacturing tolerances, leading to mode size and fiber core center variances. For example, older multimode GIF fibers and older OM2 and OM3 fibers may not be as optimized as newer fibers. Thus, newer fibers may be used, with stricter manufacturing tolerances, to avoid such issues.

Figure 7:
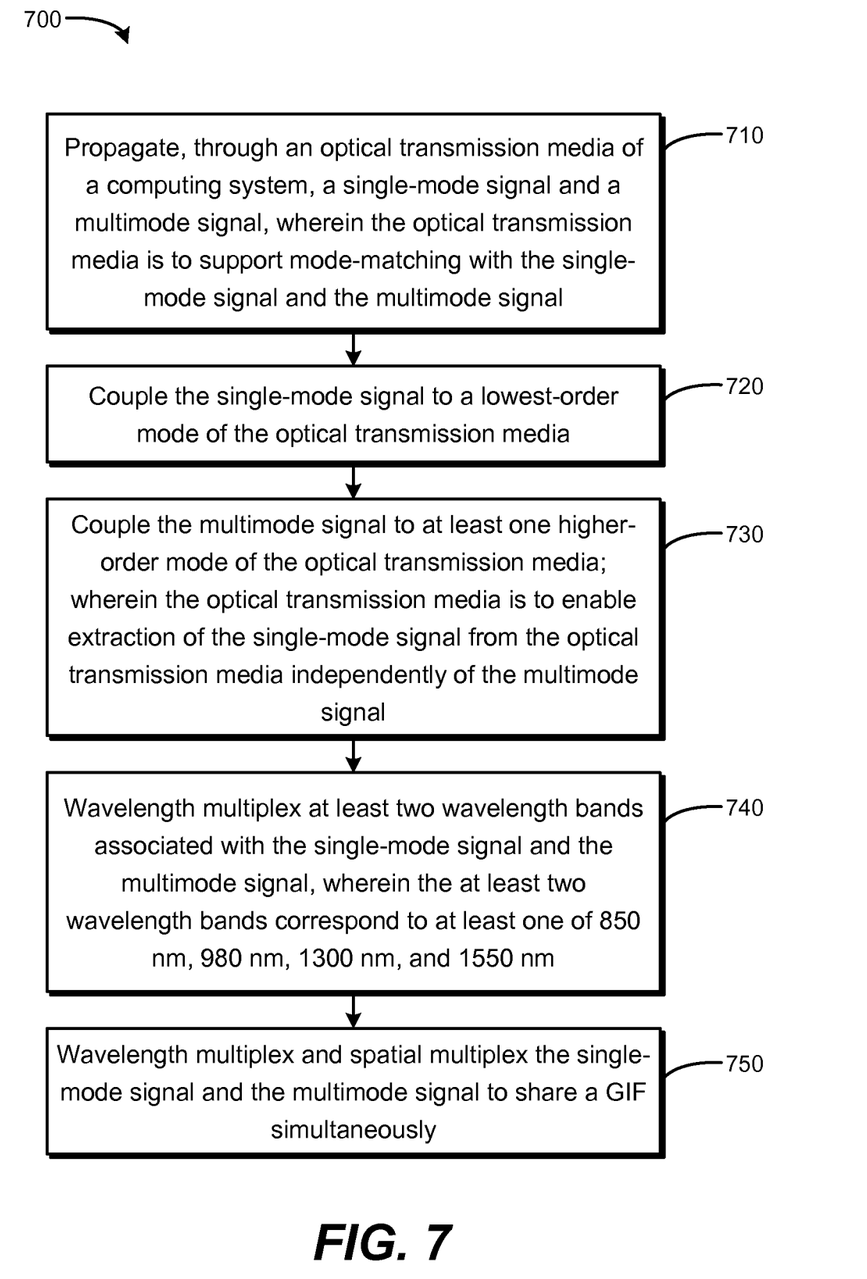
FIG. 7 is a flow chart based on propagating a single-mode signal and a multimode signal according to an example.

FIG. 7 is a flow chart 700 based on propagating a single-mode signal and a multimode signal according to an example. In block 710, a single-mode signal and a multimode signal are propagated through an optical transmission media of a computing system. The optical transmission media is to support mode-matching with the single-mode signal and the multimode signal. In block 720, the single-mode signal is coupled to a lowest-order mode of the optical transmission media. In block 730, the multimode signal is coupled to at least one higher-order mode of the optical transmission media. The optical transmission media is to enable extraction of the single-mode signal from the optical transmission media independently of the multimode signal. In block 740, at least two wavelength bands associated with the single-mode signal and the multimode signal are wavelength multiplexed. The at least two wavelength bands correspond to at least one of 850 nm, 980 nm, 1300 nm, and 1550 nm. For example, multiple different signals from a wavelength band may be multiplexed. In block 750, the single-mode signal and the multimode signal are wavelength multiplexed and spatially multiplexed to share a GIF simultaneously.

What is claimed is:

1. A computing system comprising:
   an optical transmission media to propagate a single-mode signal and a multimode signal, wherein the optical transmission media is to support mode-matching with the single-mode signal and the multimode signal;
   a single-mode air-gap connector optically coupleable to a removable system board to communicate via the single-mode signal;
   a multimode air-gap connector optically coupleable to the removable system board to communicate via the multimode signal;

wherein the single-mode air-gap connector is associated with a first precision to align at least one of i) the single-mode signal and ii) the multimode signal, wherein the multimode air-gap connector is associated with a second precision lower than the first precision, to align the multimode signal such that the multimode air-gap connector has a higher tolerance for inaccuracy of alignment, between the optical transmission media and the removable system board, compared to the single-mode air-gap connector;

wherein a lowest-order mode of the optical transmission media is to couple the single-mode signal, and at least one higher-order mode of the optical transmission media is to couple the multimode signal, and the optical transmission media is to enable extraction of the single-mode signal from the optical transmission media independently of the multimode signal.

2. The computing system of claim 1, wherein the optical transmission media comprises a multimode graded index fiber (MM-GIF).

3. The computing system of claim 1, wherein the optical transmission media comprises a multimode waveguide.

4. The computing system of claim 1, wherein the optical transmission media is associated with a lowest-order spatial mode having a phase velocity that is mismatched compared to the higher-order spatial modes associated with the optical transmission media.

5. The computing system of claim 1, wherein the optical transmission media is to couple the at least one higher-order mode of a multi-spatial mode optical source.

6. The computing system of claim 5, wherein the optical transmission media is to couple a Vertical-Cavity Surface-Emitting Laser (VCSEL).

7. The computing system of claim 1, wherein the optical transmission media is to couple the lowest-order mode of a single-spatial mode optical source substantially into a lowest order mode of the optical transmission media.

8. The computing system of claim 1, further comprising an optical backplane including a plurality of optical transmission media in a bus configuration.

9. A computing system comprising:
an optical transmission media to propagate a single-mode signal and a multimode signal, wherein the optical transmission media is to support mode-matching with the single-mode signal and the multimode signal;
a mode matching system to couple the single-mode signal with a lowest-order mode of the optical transmission media, and to couple the multimode signal to at least one higher-order mode of the optical transmission media, wherein the single-mode signal is extractable from the optical transmission media independently of the multimode signal;
a single-mode air-gap connector optically coupleable to a removable system board to communicate via the single-mode signal; and
a multimode air-gap connector optically coupleable to the removable system board to communicate via the multimode signal;
wherein the single-mode air-gap connector is associated with a first precision to align at least one of i) the single-mode signal and ii) the multimode signal, wherein the multimode air-gap connector is associated with a second precision lower than the first precision, to align the multimode signal such that the multimode air-gap connector has a higher tolerance for inaccuracy of alignment, between the optical transmission media and the removable system board, compared to the single-mode air-gap connector.

10. The computing system of claim 9, wherein the mode matching system includes an air-gap connector including a lens to interact with an expanded beam associated with coupling the single-mode signal and the multimode signal.

11. The computing system of claim 9, wherein the mode matching system is compatible with a multi-spatial mode optical source and a single-spatial mode optical source to enable a removable system board to communicate with the optical transmission media of an optical backplane of the computing system.

12. The computing system of claim 9, wherein the mode matching system is to couple the multimode signal to the optical transmission media based on a first coupling tolerance, and the mode matching system is to couple the single-mode signal to the optical transmission media based on a second coupling tolerance, wherein the first coupling tolerance is less strict than the second coupling tolerance.

13. A method comprising:
propagating, through an optical transmission media of a computing system, a single-mode signal and a multimode signal, wherein the optical transmission media is to support mode-matching with the single-mode signal and the multimode signal;
coupling the single-mode signal to a lowest-order mode of the optical transmission media, via a single-mode air-gap connector optically coupleable to a removable system board to communicate via the single-mode signal; and
coupling the multimode signal to at least one higher-order mode of the optical transmission media via a multimode air-gap connector optically coupleable to the removable system board to communicate via the multimode signal, wherein the optical transmission media is to enable extraction of the single-mode signal from the optical transmission media independently of the multimode signal;
wherein the single-mode air-gap connector is associated with a first precision to align at least one of i) the single-mode signal and ii) the multimode signal, wherein the multimode air-gap connector is associated with a second precision lower than the first precision, to align the multimode signal such that the multimode air-gap connector has a higher tolerance for inaccuracy of alignment, between the optical transmission media and the removable system board, compared to the single-mode air-gap connector.

14. The method of claim 13, further comprising wavelength multiplexing at least two wavelength bands associated with the single-mode signal and the multimode signal, wherein the at least two wavelength bands correspond to at least one of 850 nm, 980 nm, 1300 nm, and 1550 nm.

15. The method of claim 13, wherein the optical transmission media is a graded index fiber (GIF), the method further comprising wavelength multiplexing and spatially multiplexing the single-mode signal and the multimode signal to share the GIF simultaneously.

* * * * *